(12) United States Patent
Fletcher

(10) Patent No.: US 7,325,025 B2
(45) Date of Patent: Jan. 29, 2008

(54) LOOK-AHEAD CARRY ADDER CIRCUIT

(75) Inventor: Thomas D. Fletcher, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 10/020,447

(22) Filed: Dec. 18, 2001

(65) Prior Publication Data
US 2003/0115237 A1    Jun. 19, 2003

(51) Int. Cl.
*G06F 7/50* (2006.01)
(52) U.S. Cl. ..................................... 708/711
(58) Field of Classification Search ......... 708/710–714
See application file for complete search history.

(56) References Cited

U.S. PATENT DOCUMENTS

| 4,118,786 | A | * | 10/1978 | Levine et al. ............... 708/710 |
| 4,323,981 | A | * | 4/1982 | Nakamura ................... 708/711 |
| 4,570,084 | A | | 2/1986 | Griffin et al. |
| 4,573,137 | A | * | 2/1986 | Ohhashi ..................... 708/714 |
| 4,584,661 | A | * | 4/1986 | Grundland .................. 708/712 |
| 4,623,982 | A | * | 11/1986 | Ware ......................... 708/714 |
| 4,737,926 | A | * | 4/1988 | Vo et al. ..................... 708/711 |
| 5,117,386 | A | * | 5/1992 | Persoon et al. .............. 708/711 |
| 5,146,424 | A | * | 9/1992 | Peterson et al. ............. 708/711 |
| 5,278,783 | A | * | 1/1994 | Edmondson ................ 708/711 |
| 5,568,069 | A | | 10/1996 | Chow |
| 5,777,491 | A | | 7/1998 | Hwang |
| 5,896,308 | A | * | 4/1999 | Gonfaus et al. ............. 708/712 |
| 5,943,251 | A | * | 8/1999 | Jiang et al. ................. 708/710 |
| 5,977,789 | A | | 11/1999 | Gayles |
| 6,028,454 | A | | 2/2000 | Elmasry et al. |
| 6,208,907 | B1 | | 3/2001 | Durham et al. |

FOREIGN PATENT DOCUMENTS

JP    5-259893    10/1993

OTHER PUBLICATIONS

Related U.S. Appl. No. 09/956,903, filed Sep. 21, 2001.
Related U.S. Appl. No. 09/892,565, filed Jun. 28, 2001.
Related U.S. Appl. No. 09/893,868, filed Jun. 29, 2001.
Yee et al, "Clock-Delayed Domino for Dynamic Circuit Design", IEEE Transactions on Very Large Scale Integration (VLSI) Systems, vol. 8, No. 4, Aug. 2000, pp. 425-430.
Yee et al, "Clock-Delayed Domino for Adder and Combinational Logic Design", IEEE, 1063-6404/96, pp. 332-337, 1996.
Jung, Perepelitsa, Sobelman, "Time Borrowing in High-Speed Functional Units Using Skew-Tolerant Domino Circuits," Proceedings, IEEE International Symposium on Circuits and Systems, pp. V-641-V-644, 2000.
Presentation by Carl Sechen dated Mar. 17, 2000.
Taub, *Digital Circuits and Microprocessors*, pp. 205-212, McGraw-Hill, 1982.

* cited by examiner

*Primary Examiner*—Tan V. Mai
(74) *Attorney, Agent, or Firm*—Kenyon & Kenyon LLP

(57) ABSTRACT

A look-ahead carry adder circuit has multiple stages that are grouped into a carry generation blocks. The size of one of the carry generation blocks is three stages. There may be other carry generation blocks that are of a size that is a whole number multiple of three stages. In an embodiment, the look-ahead carry adder has only one critical path. In a further embodiment, the load on the critical path is minimized by using buffers.

25 Claims, 8 Drawing Sheets

LOOK-AHEAD CARRY ADDER CIRCUIT

FIELD OF THE INVENTION

Embodiments of the present invention relate to adder circuits. In particular, embodiments of the present invention relate to the topology of a look-ahead carry adder that has carry generation blocks arranged in groups.

BACKGROUND

An adder is a logic circuit that performs the addition of multi-bit binary numbers. Adders are one of the fundamental sub-units used in complex digital circuits such as, for example, an arithmetic logic unit in a central processing unit. Because adders are widely used, an increase in the processing speed of the adder may lead to a significant increase in the overall processing speed of the device of which the adder is a part.

When adding multi-bit binary numbers, the sum of any two bits may cause a carry that impacts the results at more significant bits. For this reason, an adder circuit must be designed to take into account ripple carrys that may occur. For example, the carry from the addition of the least significant input bits may be allowed to ripple across to logic that provides the most significant bits of the sum. A carry look-ahead adder is a type of fast adder that provides logic to permit the carry to propagate faster, with fewer number of gates, than having to ripple through each of the previous bit positions. As is known in the art, a carry look-ahead adder may include sub-circuits that provide intermediate values such as a generate value, a propagate value, and a carry value for different bit positions in the binary numbers being added. Such generate, propagate and carry values may then be used to provide the final sums bits. The logic for each bit position may be referred to as a "stage" of the adder.

In addition to processing speed, another design criteria considered is the complexity of the circuit. If the complexity of the circuit is increased, this may increase the design costs of the circuit as well as the cost of the circuit materials, the amount of area occupied by the circuit, and the cost to operate the circuit. Thus, there is an advantage to both reducing the processing speed and the complexity of the circuit. A technique used to reduce the complexity of a look-ahead carry adder circuit is to arrange the carry generation logic as units ("groups") each of which receives a subset of the input bits and provides carry bits as outputs. In an embodiment, the carry generation block associated with a stage provides a carry value for use by the next stage. For example, assuming that the two addends are A and B, then the carry generation block associated with bits $A_0$ and $B_0$ provides a carry value $C_1$. If the result of $A_0+B_0$ provides a carry, then $C_1=1$. As would be appreciated by a person of skill in the art, a "value" received by (or output from) a gate is a voltage range that represents a logical value. In an embodiment, the carry generation block for each group provides one or more carry outputs which may be connected to one or more inputs of the carry generation block for the next group. For example, the inputs and logic may be grouped into units of four bits, with a carry output from the first group (e.g., the logic for bits 0-3) used as a carry input to the second group (e.g., the logic for bits 4-7), a carry outputs from the second group used a carry inputs to the third group, etc. In known look-ahead carry adders, the inputs (and corresponding logic) have been grouped in multiples of 2. For example, each group may have 2 bits. In other embodiments, each group contains 4 bits, each group contains 8 bits, etc.

DETAILED DESCRIPTION

The present invention discloses topologies for an improved look-ahead carry adder circuit. Embodiments of the present invention increase the processing speed of the adder and/or reduce the complexity of the adder. In an embodiment, the input addend bit pairs and the associated logic gates are grouped into a plurality of blocks and the number of bit pairs in some of all of the groups is a multiple of three. For example, one group may contain three pair of inputs bits and associated logic gates, the next group may contain six pair of input bits and associated logic gates, the next group may contain twelve bit pairs and associated logic gates, etc. In an embodiment, the adder contains group propagate and group generate gates which are clustered in groups of three. For an adder, the critical path is the slowest path from an input addend bit to a sum output bit and may be, for example, the path with the most logic or longest wires. The criticality of a path may be determined, for example, by simulation. In an embodiment of the present invention, the adder has only one critical path. In embodiments of the invention, the intermediate generate and propagate gates are buffered to reduce the load on the critical path. In embodiments, gates in the critical path of the adder are optimized by taking advantage of the logical dependency between the generate and propagate values for a stage. In addition, in embodiments transistor stacks in some or all of the gates in the adder are tapered to increase the processing speed of the gate.

Figure 1:
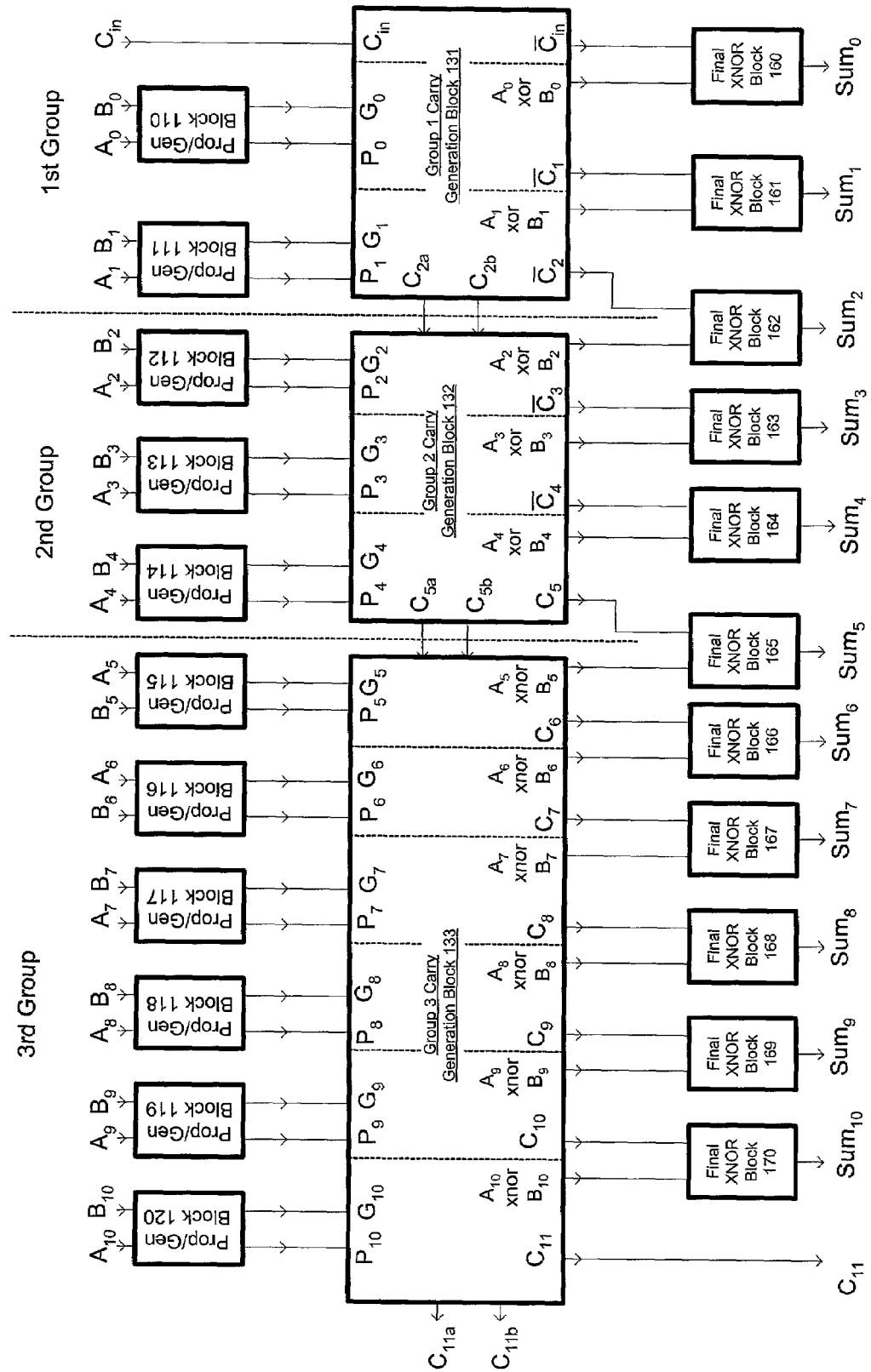
FIG. 1 is a block diagram of a look-ahead carry adder circuit according to an embodiment of the present invention.

FIG. 1 is a block diagram of a look-ahead carry adder circuit 100 according to an embodiment of the present invention. Adder 100 has inputs to receive two eleven bit addends A and B and a carry-in bit $C_{in}$. The addend A includes the eleven bits $A_0$ to $A_{10}$ and the addend B includes bits $B_0$ to $B_{10}$. Adder 100 may be referred to as an eleven bit adder with a carry-in. In another embodiment, the carry-in bit $C_{in}$ may be replaced by an additional pair of input bits, in which case the adder would be a 12-bit adder. Adder 100 has outputs to provide an eleven bit sum S (i.e., $S_0$ to $S_{10}$) and a carry output $C_{11}$. Thus, S=A+B, and $C_{11}$=1 when the result of $A_{10}$+$B_{10}$+$C_{10}$ provides a carry-out. In the embodiment shown, adder 100 also has outputs to provide $C_{11a}$ and $C_{11b}$ values (which may be equal to the $C_{11}$ or to inverted $C_{11}$). In this embodiment, the input bits and associated carry generation logic for adder 100 is arranged in three groups. The first group includes $C_{in}$ and the first two pair of input bits ($A_{0-1}$ and $B_{0-1}$), the second group includes the next three more significant pairs of input bits ($A_{2-4}$ and $B_{2-4}$), and the third group includes the next six more significant pairs of input bits ($A_{5-10}$ and $B_{5-10}$). Another embodiment may have additional groups, with the number of stages in each succeeding group being double the size of the previous group. Thus, another embodiment may be a twenty-three bit adder which has a fourth group that includes twelve additional bit pairs ($A_{11-22}$ and $B_{11-22}$).

Figure 2:
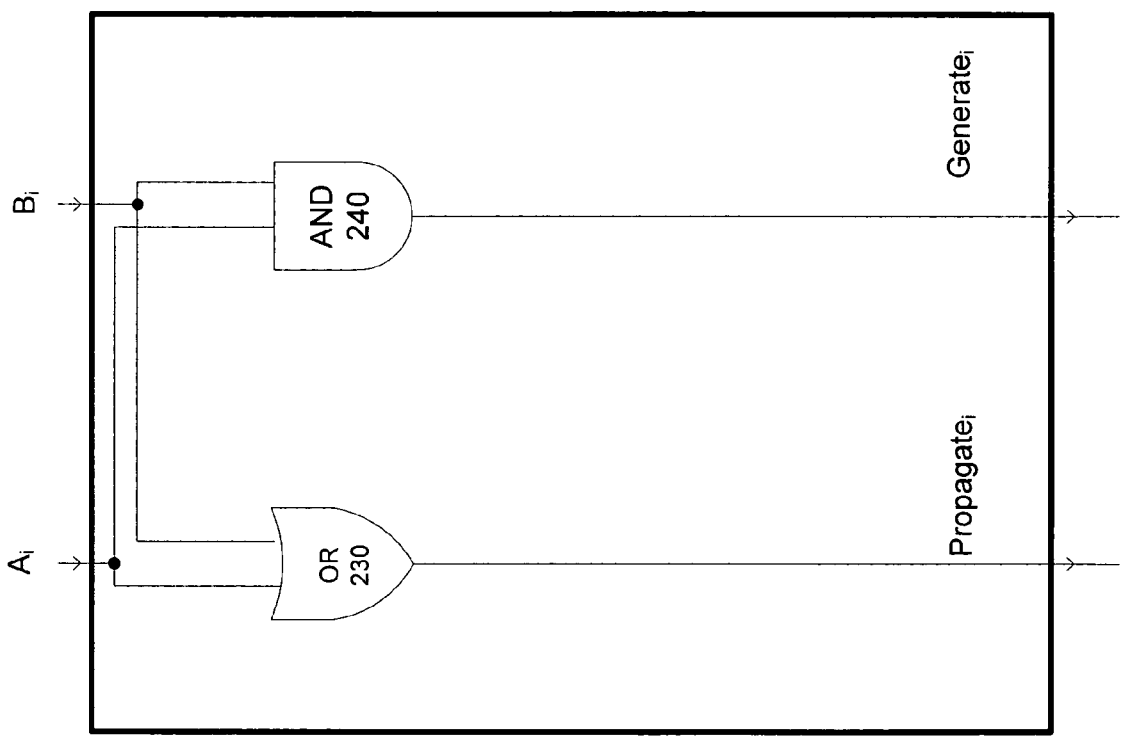
FIG. 2 is a block diagram of a propagate/generate block according to an embodiment of the present invention.
Figure 3:
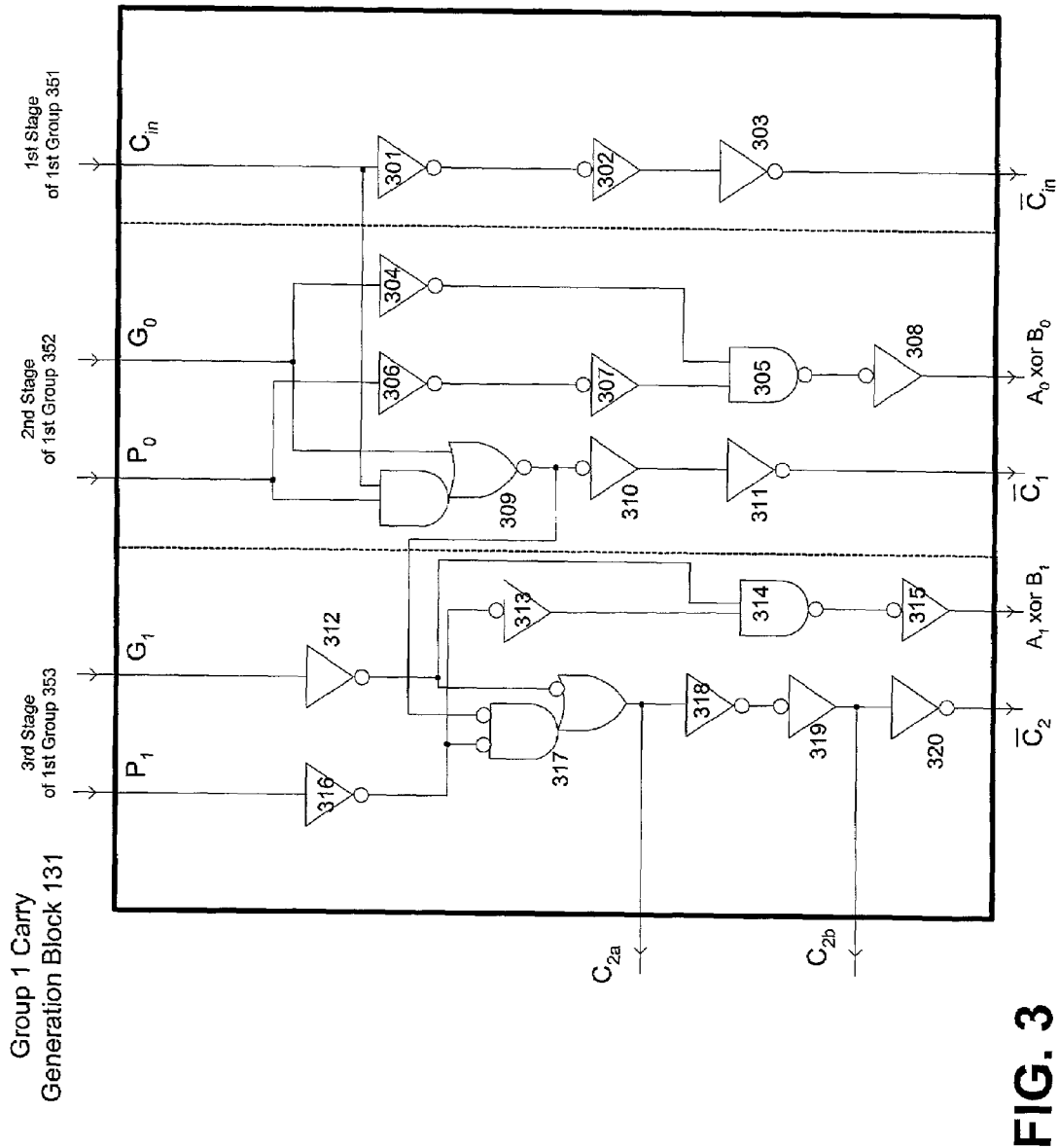
FIG. 3 is a block diagram of a carry generation block for a first group of stages according to an embodiment of the present invention.
Figure 4:
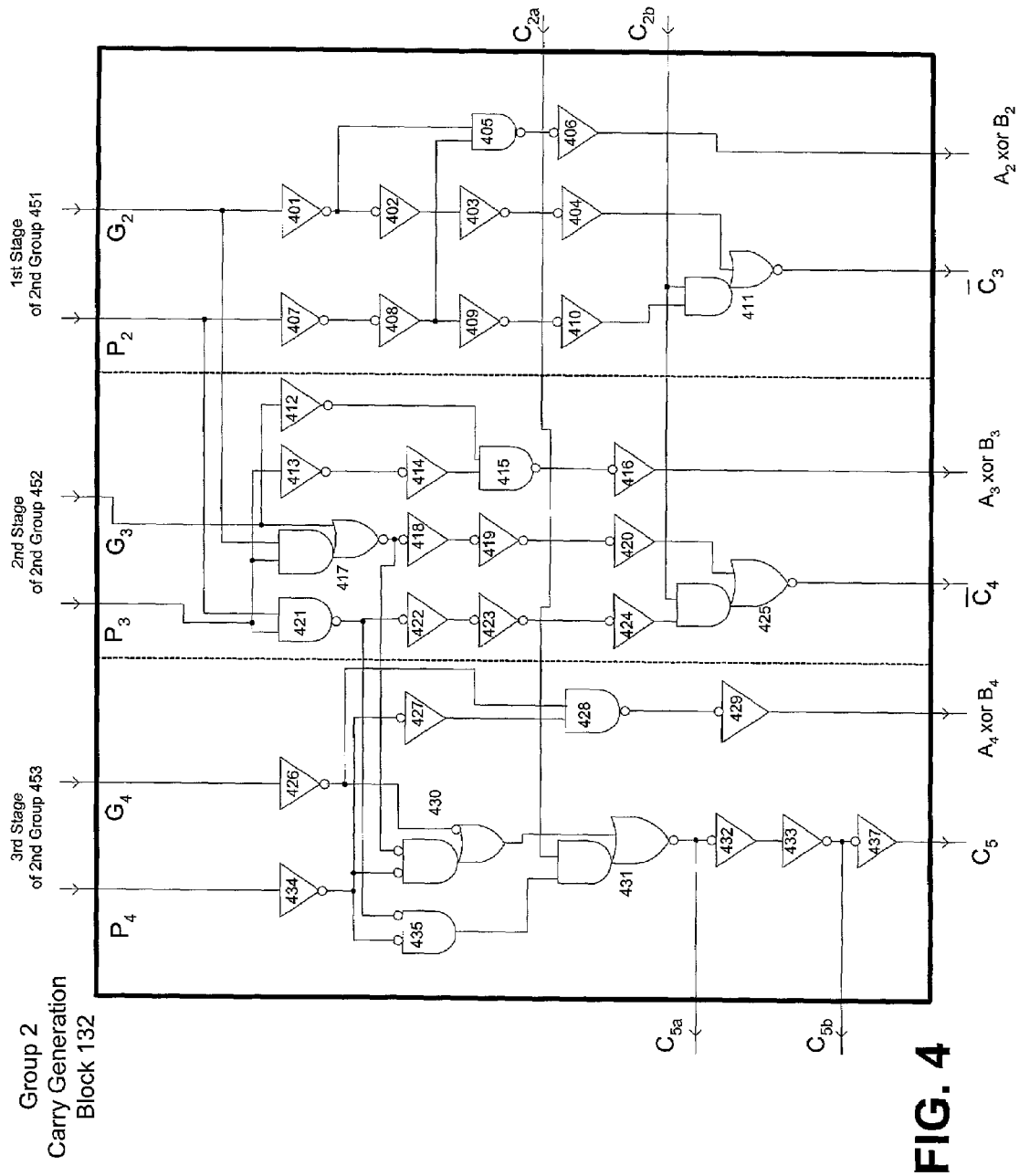
FIG. 4 is a block diagram of a carry generation block for a second group of stages according to an embodiment of the present invention.
Figure 5:
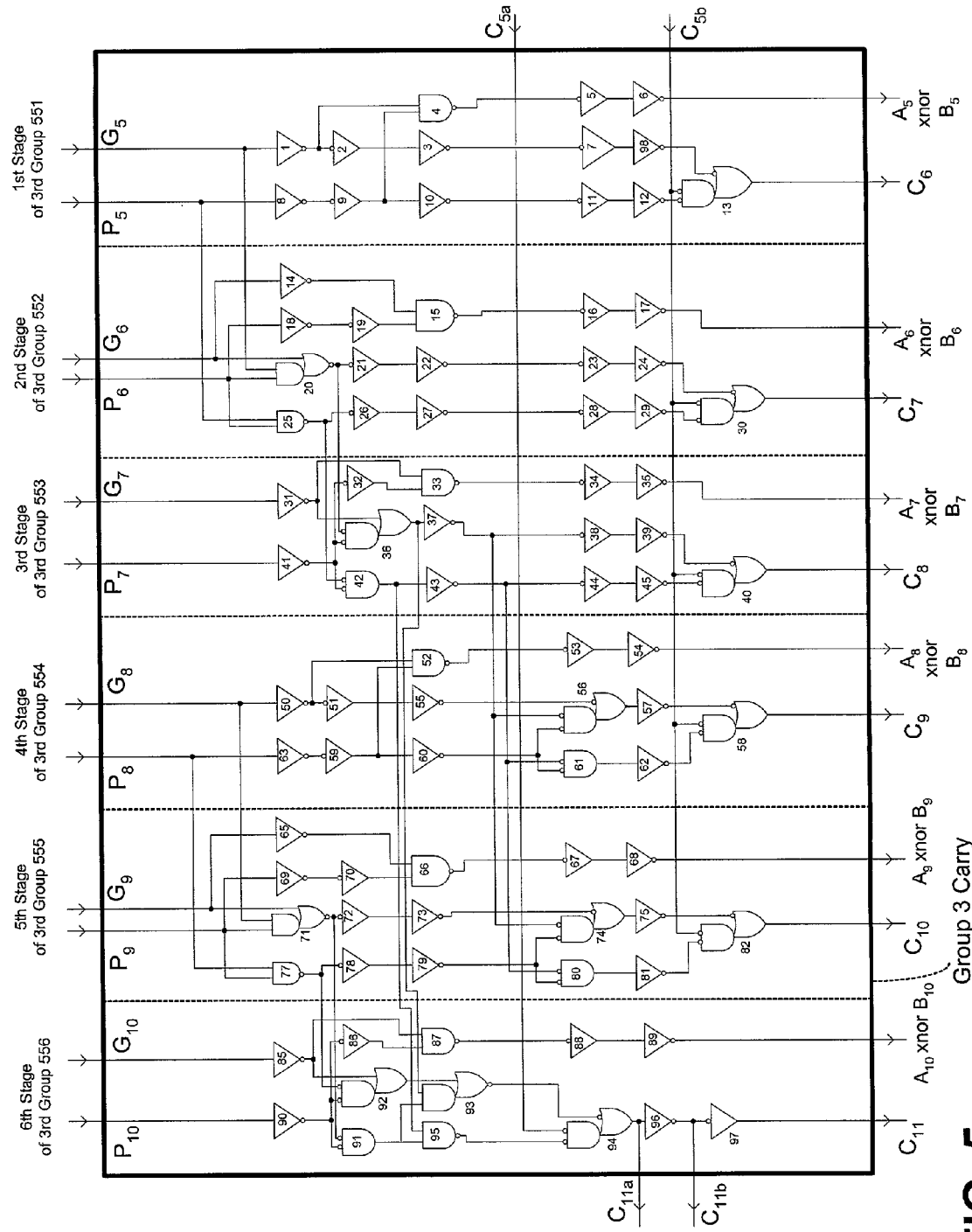
FIG. 5 is a block diagram of a carry generation block for a third group of stages according to an embodiment of the present invention.

Adder 100 includes eleven propagate/generate blocks 110-120, three carry generation blocks 131-133, and eleven final XNOR blocks 160-170. Each propagate/generate block provides a propagate value and a generate value for a stage. An embodiment of a propagate/generate block is shown in FIG. 2. Each of the propagate/generate blocks 110-120 are connected to one of the three carry generation blocks 131-133 as inputs to the carry generation blocks. The carry generation blocks 131-133 are connected to each of the final XNOR blocks 160-170 as inputs to the final XNOR blocks. Group 1 Carry Generation Block 131 provides the carrys for the first group of stages, based on the associated propagate and generate values, and may be arranged as shown in FIG. 3. Similarly, Group 2 Carry Generation Block 132 provides the carrys for the second group of stages and may be arranged as shown in FIG. 4, while Group 3 Carry Generation Block 133 provides the carrys for the third group of stages and may be arranged as shown in FIG. 5. Of course, the present invention may also use propagate/generate and carry generation blocks other than those shown in FIGS. 2-5.

FIG. 2 is a block diagram of a propagate/generate block according to an embodiment of the present invention. FIG. 2 shows a propagate/generate block 210 that has inputs $A_i$ and $B_i$ and outputs propagate$_i$ and generate$_i$. As discussed above, in adder 100, each pair of corresponding addend bits for a stage (i.e., $A_i$ and $B_i$) are inputs to one of the propagate/generate blocks 110-120, and each propagate/generate block has outputs to provide a propagate and generate value for that stage. For example, $A_1$ and $B_1$ are inputs to Propagate/Generate Block 111, and Propagate/Generate Block 111 has a pair of outputs to provide a $P_1$ value and $G_1$ value. Propagate/generate block 210 of FIG. 2 contains an OR gate 230 and an AND gate 240. The $A_i$ value is input to both OR gate 230 and AND gate 240, and the $B_i$ value is input to both OR gate 230 and AND gate 240. The output of OR gate 230 is connected to the output propagate$_i$, and the output of AND gate 240 is connected to the output generate$_i$. As would be appreciated by a person of ordinary skill in art, in this embodiment $P_i$=$A_i$ OR $B_i$, and $G_i$=$A_i$ AND $B_i$.

As noted above, each group carry generation block (131-133) may receive as inputs the propagate and generate values for the stages that correspond to that group, and each group carry generation block may provide as outputs the carry values for the stages corresponding to that group. In addition, each group carry generation block may also provide as outputs the values for either $A_i$ XOR $B_i$ or $A_i$ XNOR $B_i$, where i=the stages corresponding to that group. For example, the outputs from Propagate/Generate Blocks 110-

111 may be connected as inputs to Group 1 Carry Generation Block 131. In addition, Group 1 Carry Generation Block 131 may have an additional input to receive the carry-in to adder 100, and Group 1 Carry Generation Block 131 may have an output to provide the inverted carry-in value as an output. Group 1 Carry Generation Block 131 may also have outputs to provide one or more carry-out values (e.g., $C_{2a}$ and $C_{2b}$) to the next group carry generation block. In this example, the inputs to Group 1 Carry Generation Block 131 are $C_{in}$, $P_0$, $G_0$, $P_1$, and $G_1$, and the outputs from Group 1 Carry Generation Block 131 are inverted $C_{in}$, $A_0$ XOR $B_0$, inverted $C_1$, $A_1$ XOR $B_1$, inverted $C_2$, $C_{2a}$ and $C_{2b}$.

In the embodiment shown in FIG. 1, the second group contains the third-fifth most significant stages, and the third group contains the sixth-eleventh most significant stages. Thus, the outputs from propagate/generate block 112-114 ($P_{2-4}$ and $G_{2-4}$) are connected as inputs to Group 2 Carry Generation Block 132. In addition, carry outputs $C_{2a}$ and $C_{2b}$ (from Group 1 Carry Generation Block 131) are connected as inputs to Group 2 Carry Generation Block 132. Group 2 Carry Generation Block 132 has outputs to provide the values $A_2$ XOR $B_2$, inverted $C_3$, $A_3$ XOR $B_3$, inverted $C_4$, $A_4$ XOR $B_4$, and $C_5$ as well as the values $C_{5a}$ and $C_{5b}$. Similarly, Group 3 Carry Generation Block 133 has inputs connected to receive the outputs from propagate/generate blocks 115-120 ($P_5$-$P_{10}$ and $G_5$-$G_{10}$) as well inputs connected to receive the carry outputs $C_{5a}$ and $C_{5b}$ (from Group 2 Carry Generation Block 132). Group 3 Carry Generation Block 133 has outputs to provide the values $A_5$ XNOR $B_5$, $C_6$, $A_6$ XNOR $B_6$, $C_7$, $A_7$ XNOR $B_7$, $C_8$, $A_8$ XNOR $B_8$, $C_9$, $A_9$XNOR $B_9$, $C_{10}$, $A_{10}$ XNOR $B_{10}$, and $C_{11}$. Group 3 Carry Generation Block 133 also has outputs to provide the values $C_{11a}$ and $C_{11b}$. The outputs $C_{11a}$ and $C_{11b}$ may be used to provide carry-ins to the succeeding group carry generation block. In an embodiment (such as shown in FIG. 1) that does not have a succeeding group carry generation block may not include outputs $C_{11a}$ and $C_{11b}$.

For each stage i, the appropriate group carry generation block has outputs for either (1) $C_i$ and $A_i$ XOR $B_i$ or (2) $C_i$ and $A_i$ XOR $B_i$. These outputs may be connected as inputs to a corresponding Final XNOR block 160-170. Thus, the Final XNOR block 160 has inputs that are connected to Group Carry Generation Block 131 to receive the values $A_0$ XNOR $B_0$ and inverted $C_{in}$, the Final XNOR block 161 has inputs that are connected to Group Carry Generation Block 131 to receive the values $A_1$ XOR $B_1$ and inverted $C_1$, etc. Each Final XNOR block may contain logic to perform an XOR between the input values and may have an output to provide the sum value for that stage (Sum$_i$) as an output of adder 100. Thus, Final XNOR block 160 may have an output to provide the value Sum$_0$, Final XNOR block 161 may have an output to provide the value Sum$_1$, etc. Each Final XNOR block 160-170 may use any XOR topology, such as a normal pass gate XOR.

As would be appreciated by a person of skill in the art, according to this embodiment $S_0$=($A_0$ XOR $B_0$) XNOR inverted $C_{in}$=($A_0$ XOR $B_0$) XOR $C_{in}$. For the sixth through eleventh stages (i=5 to 10), $S_i$=($A_i$ XNOR $B_i$) XNOR $C_i$=($A_i$ XOR $B_i$) XOR $C_{in}$. As discussed below, the value $C_i$ or the value ($A_i$ XNOR $B_i$) is inverted by the carry generation blocks to achieve buffering.

Example Embodiments of Carry Generation Blocks 1-3

This section discusses examples of the structure for embodiments of carry generation blocks 131-133. In other embodiments, the carry generation blocks may have a different structures. In an embodiment, the adder has a carry generation block that has a size of three stages. In another embodiment, other carry generation blocks in the adder are of a size that is a whole number multiple of three stages. The next section will discuss the operation of adder 100 to add two numbers according to these example embodiments.

Figure 8:
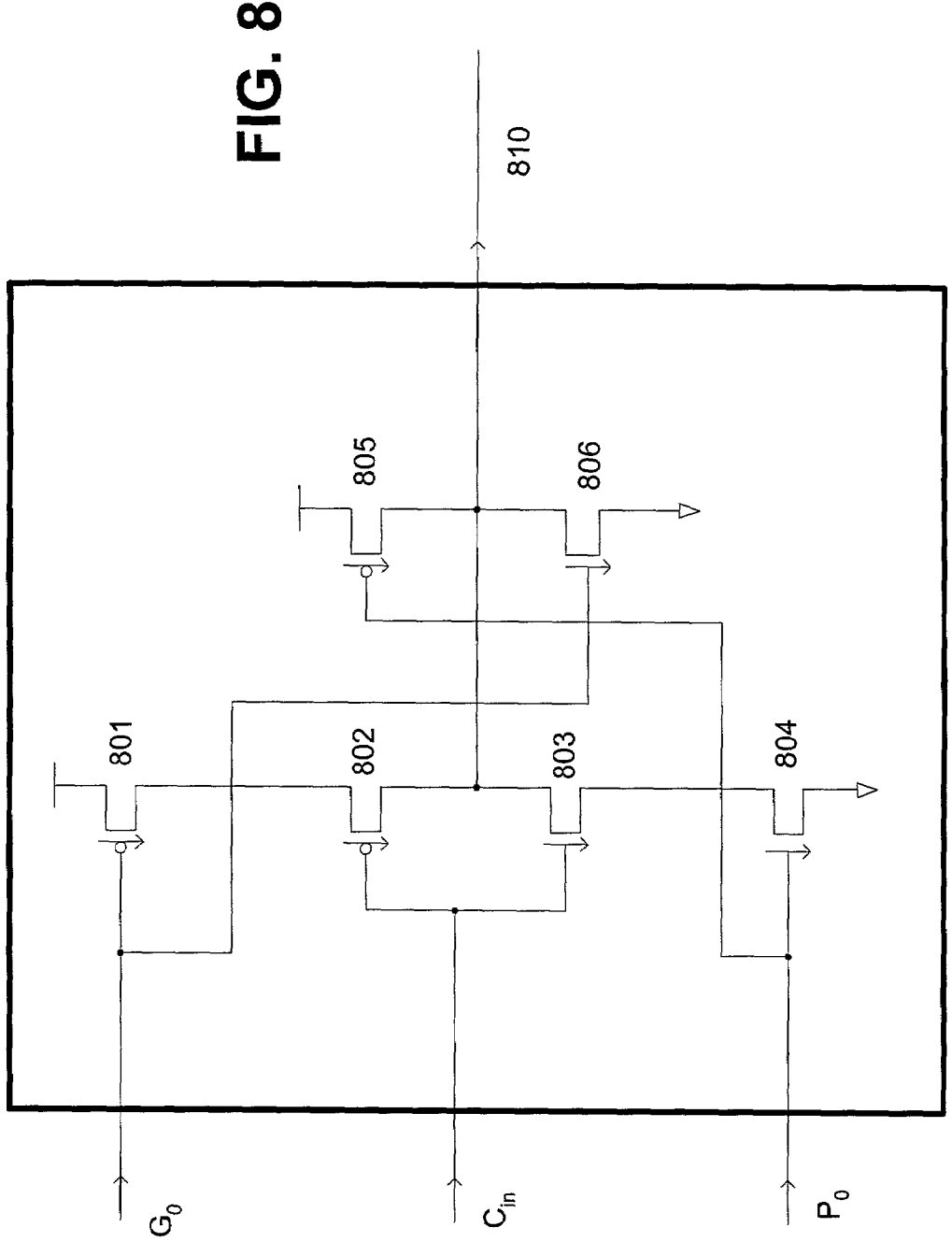
FIG. 8 is a block diagram of another AND-OR-INVERT gate with tapered stacks and a reduced number of serial transistors according to an embodiment of the present invention.

FIG. 3 is a block diagram of a carry generation block for a first group of stages 351-353 according to an embodiment of the present invention. In particular, FIG. 3 shows details of Group 1 Carry Generation Block 131 of FIG. 1. In this embodiment, the first group includes the first two stages. Thus, Group 1 Carry Generation Block 131 has inputs to receive the propagate and generate values for the first two stages as well as the carry input $C_{in}$, and has outputs to provide inverted carry outputs and XOR results for these stages. The gates in Group 1 Carry Generation Block 131 includes a plurality of inverters, two NAND gates, an AND-OR-INVERT gate 309, and an INVERT-AND-OR gate 317. From a functional perspective, the AND-OR-INVERT gate 309 performs an AND function for two inputs, OR's the results of this function with a third input, and provides as an output the inverted result of the OR function. Similarly, from a functional perspective INVERT-AND-OR gate 317 inverts three inputs, performs an AND function on the first two inverted inputs, performs an OR function on the result of the AND function and the third inverted input, and provides the result of this OR function as an output. An example of a topology for AND-OR-INVERT gate 309 is shown in FIG. 8. The logic gates for Group 1 Carry Generation Block 131 will be discussed with reference to the inputs and outputs for each of the stages in this group.

The $C_{in}$ input to Group 1 Carry Generation Block 131 may be connected to inverter 301 and through a stack of three inverters (301-303) to the inverted $C_{in}$ output for this carry generation block. In the next stage, the $C_{in}$ input may be connected to one of the AND inputs of AND-OR-INVERT gate 309. The $P_0$ input may be connected to another of the AND inputs to AND-OR-INVERT gate 309. The $G_0$ input may be connected to the OR input of AND-OR-INVERT gate 309. The output from AND-OR-INVERT gate 309 may be connected through a stack of inverters (310 and 311) to the output inverted $C_1$, which may be an output of Group 1 Carry Generation Block 131. The $P_0$ input maybe connected through a stack of inverters (306-307) to an input of NAND gate 305, and the $G_0$ input may be connected through an inverter (304) to the other input of NAND gate 305. The output of NAND gate 305 may be connected through inverter 308 to the $A_0$ XOR $B_0$ output of Group Carry Generation Block 131.

The final stage in Group 1 Carry Generation Block 131 may be associated with inputs $P_1$ and $G_1$. As can be appreciated by a person of skill in the art, the value of inverted $C_2$ may be based upon the value of $P_1$, $G_1$ and $C_1$. The $P_1$ input may be connected through inverter 316 to one of the AND inputs to INVERT-AND-OR gate 317, and the $G_1$ input may be connected through inverter 312 to the OR input to INVERT-AND-OR gate 317. The output of AND-OR-INVERT gate 309 (which is equal to the value inverted $C_1$) may be input to the other AND input of INVERT-AND-OR gate 317. The output of INVERT-AND-OR gate 317 may be connected through a stack of three inverters (318-320) to the inverted $C_2$ output for Group 1 Carry Generation Block 131. In addition, the output of INVERT-AND-OR gate 317 may be connected to the $C_{2a}$ output and may be connected through a stack of two inverters (318 and 319) to the $C_{2b}$ output. As can be appreciated, the values $C_{2a}$ and $C_{2b}$ are equal to the value $C_2$. The logic to provide the output $A_1$ XOR $B_1$ may be similar to analogous logic for the previous stage. The input $P_1$ may be connected through a stack of two inverters (316 and 313) to an input of NAND gate 314, and the input $G_0$ may be connected through inverter 312 to the other input of NAND gate 314. The output of NAND gate 314 maybe connected through inverter 315 to the $A_1$ XOR $B_1$ output of Group 1 Carry Generation Block 131.

According to the embodiment shown in FIG. 3, the intermediate values $A_i$ XOR $B_i$ (which are XOR'ed with the value carry$_i$ to provide the values Sum$_i$) is provided by a NAND tree, such as a NAND gate connected to one or more buffers at the inputs and/or output, rather than by an XOR gate. For example, the value $A_1$ XOR $B_1$ is provided by inverting the output of NAND gate 314. The inputs to NAND gate 314 are the value propagate$_1$ after it is inverted twice, and the inverted value generate$_1$. As can be seen from FIG. 2, the value propagate$_1$ may be provided by $A_1$ OR $B_1$, and the value generate$_1$ may be provided by $A_1$ AND $B_1$. Thus, the NAND gates have a pair of inputs that are connected to a propagate output and a generate output from the propagate/generate block through one or more inverters (i.e., buffers), and the NAND gates is connected to an XOR output of a carry generation block through a buffer. The intermediate $A_i$ XOR $B_i$ and $A_i$ XNOR $B_i$ values for groups 2 and 3 may be provided in an analogous fashion.

FIG. 4 is a block diagram of a carry generation block for a second group of stages 451-453 according to an embodiment of the present invention. In particular, FIG. 4 shows an example of Group 2 Carry Generation Block 132 of FIG. 1. Group 2 Carry Generation Block 132 provides carry outputs for the second group of stages based on the propagate, generate and carry-in values for those stages. Thus, Group 2 Carry Generation Block 132 has inputs to receive $P_{2-4}$ and $G_{2-4}$, as well as the values $C_{2a}$ and $C_{2b}$ (from Group 1 Carry Generation Block 131). In addition to having carry outputs, Group 2 Carry Generation Block 132 also has outputs to provide the values $A_2$ XOR $B_2$, $A_3$ XOR $B_3$, and $A_4$ XOR $B_4$, as well as outputs for the carry-out values $C_{5b}$ and $C_{5a}$. Group 2 Carry Generation Block 132 includes a plurality of inverters, NAND gates, an INVERT-AND gate 435, and four AND-OR-INVERT gates (411, 417, 425, 430, 431). The logic gates for Group 2 Carry Generation Block 132 will be discussed with reference to the inputs and outputs for each of the stages in that group.

With regard to the first stage of this group, the $P_2$ input may be connected through a stack of four inverters (407-410) to an AND input of AND-OR-INVERT gate 411. The $C_{2b}$ input (which provides the $C_2$ value) may be connected to the other AND input of AND-OR-INVERT gate 411. The $G_2$ input may be connected through a stack of four inverters (401-404) to the OR input of AND-OR-INVERT gate 411. The output of AND-OR-INVERT 411 gate may be connected to the inverted $C_3$ output of Group 2 Carry Generation Block 132. Again, the logic to provide the output $A_2$ XOR $B_2$ maybe similar to analogous logic for the previous stages. The $P_2$ input may be connected through a stack of two inverters (407-408) to an input of NAND gate 405, and the $G_2$ input may be connected through inverter 401 to the other input of NAND gate 405. The output of NAND gate 405 may be connected through inverter 406 to the $A_2$ XOR $B_2$ output of Group 2 Carry Generation Block 132.

As to the second stage of this group, the $P_2$ input and $P_3$ input are each connected to one of the inputs to NAND gate 421, the output of which may be connected through a stack of three inverters (422-424) to an AND input of AND-OR-INVERT gate 425. The input $C_{2b}$ (which provides the $C_2$ value) may be connected to the other AND input of AND-OR-INVERT gate 425. The $G_2$ input and $P_3$ inputs may each be connected to one of the inputs to AND-OR-INVERT gate 417. The $G_3$ input may be connected to the OR input of AND-OR-INVERT gate 417, the output of which may be connected through a stack of three inverters (418-420) to the OR input of AND-OR-INVERT gate 425. The output of AND-OR-INVERT gate 425 may be connected to the inverted $C_4$ output of Group 2 Carry Generation Block 132. With regard to the XOR output for this stage, the $P_3$ input may be connected through a stack of two inverters (413 and 414) to an input of NAND gate 415, and the $G_3$ input may be connected through inverter 412 to the other input of NAND gate 415. The output of NAND gate 415 may be connected through inverter 416 to the $A_3$ XOR $B_3$ output of Group 2 Carry Generation Block 132.

The carry out for the third stage of this group may be provided as follows. The $P_4$ input may be connected through an inverter 434 to an input of INVERT-AND gate 435 and to an AND input of INVERT-AND-OR gate 430. The output of NAND gate 421 may be also connected to an input of INVERT-AND gate 435. The $G_4$ input may be connected through an inverter 426 to the OR input of INVERT-AND-OR gate 430. The output of INVERT-AND gate 435 may be connected to an AND input of AND-OR-INVERT gate 431, and the $C_{2a}$ input (which may be equal to the value of $C_2$) may be connected to the other AND input of AND-OR-INVERT gate 431. The output of INVERT-AND-OR gate 430 may be connected to the OR input of AND-OR-INVERT gate 431. The output of AND-OR-INVERT gate 431 may be connected through a stack of three inverters (432, 433, 437) to the output $C_5$. AND-OR-INVERT gate 431 may be also connected to the output $C_{5a}$ and may be connected through a stack of two inverters (432-433) to output $C_{5b}$. With regard to the XOR output, input $P_4$ may be connected through a stack of two inverters (434 and 427) to an input of NAND gate 428. Input $G_4$ may be connected through inverter 426 to the other input of NAND gate 428. The output of NAND gate 428 may be connected through inverter 429 to the $A_4$ XOR $B_4$ output of Group 2 Carry Generation Block 132.

FIG. 5 is a block diagram of a carry generation block for a third group of stages according to an embodiment of the present invention. In particular, FIG. 5 shows an example of Group 3 Carry Generation Block 133 of FIG. 1. Group 3 Carry Generation Block 133 provides carry outputs $C_{6-11}$ for the third group of stages based on the propagate and generate values for those stages. Thus, Group 3 Carry Generation Block 133 has inputs to receive $P_{5-10}$ and $G_{5-10}$, as well as the values $C_{5a}$ and $C_{5b}$ (from Group 2 Carry Generation Block 132). In addition to having outputs to provide carry outputs $C_{6-11}$, Group 3 Carry Generation Block 133 also has outputs to provide the values $A_i$ XNOR $B_i$ for these stages, as well as outputs for the values $C_{11b}$ and $C_{11a}$. Group 3 Carry Generation Block 133 includes a plurality of inverters, a plurality of NAND gates, INVERT-AND gates 42 and 91, three AND-OR-INVERT gates (20, 71, 93), three INVERT-AND-OR gates (13, 30, 40, 58, 82, 74, 94), and two PARTIAL-INVERT-AND-OR gates (36 and 92) in which the OR input is not inverted before the function is preformed. The logic gates for Group 3 Carry Generation Block 133 will be discussed with reference to the inputs and outputs for each of the stages in that group.

As to the first stage for this group, the $P_5$ input may be connected through a stack of five inverters (8-12) to an AND input of INVERT-AND-OR gate 13. The $C_{5b}$ input (which has the inverted $C_5$ value) may be connected to the other AND input of INVERT-AND-OR gate 13. The $G_5$ input may be connected through a stack of five inverters (1-3, 7, 98) to the OR input of INVERT-AND-OR gate 13. The output of INVERT-AND-OR gate 13 may be connected to the $C_6$ output of Group 3 Carry Generation Block 133. With regard to the XNOR output, the $P_5$ input may be connected through two inverters (8-9) to an input of NAND gate 4, and the $G_5$ input may be connected through an inverter (1) to the other input of NAND gate 4. The output of NAND gate 4 may be connected through a stack of two inverters (5 and 6) to the $A_5$ XNOR $B_5$ output of Group Carry Generation Block 133.

The second stage for this group may be provided as follows. The input $P_6$ may be connected to one of the inputs of NAND gate 25, and the input $P_5$ may be connected to the other input of NAND gate 25. The output of NAND gate 25 may be connected through a stack of four inverters (26-29) to an AND input of INVERT-AND-OR gate 30. The input $C_{5b}$ may be connected to the other AND input of INVERT-AND-OR gate 30. The input $P_6$ may be connected to one of the AND inputs of AND-OR-INVERT gate 20. The input $G_5$ may be connected to the other AND input of AND-OR-INVERT gate 20, and the input $G_6$ may be connected to the OR input of AND-OR-INVERT gate 20. The output of AND-OR-INVERT gate 20 may be connected through a stack of four inverters (21-24) to the OR input of INVERT-AND-OR gate 30. As to the XNOR output for this stage, the input $P_6$ may be connected through a stack of two inverters (18-19) to one of the inputs of NAND gate 15, and the input $G_6$ may be connected through an inverter (14) to the other input of NAND gate 15. The output of NAND gate 15 may be connected through a stack of two inverters (16-17) to the output $A_6$ XNOR $B_6$ of Group 3 Carry Generate Block 133.

The third stage for this group may be provided as follows. The input $P_7$ may be connected through an inverter (41) to one of the inputs of INVERT-AND gate 42, and the output of NAND gate 25 may be connected to the other input of INVERT-AND gate 42. The output INVERT-AND gate 42 may be connected through a stack or three inverters (43-45) to an AND input of INVERT-AND-OR gate 40. The input $C_{5b}$ may be connected to the other AND input of INVERT-AND-OR gate 40. The input $P_7$ may be connected through an inverter (41) to one of the AND inputs of PARTIAL-INVERT-AND-OR gate 36, and the output of AND-OR-INVERT gate 20 may be connected to the other AND input of PARTIAL-INVERT-AND-OR gate 36. PARTIAL-INVERT-AND-OR gate 36 inverts the two AND inputs (but not the OR input) prior to performing and AND-OR function. The input $G_7$ may be connected through an inverter (31) to the OR input of INVERT-AND-OR gate 36. The output of PARTIAL-INVERT-AND-OR gate 36 may be connected through a stack of three inverters (37-39) to the OR input of INVERT-AND-OR gate 40. The output of INVERT-AND-OR gate 40 may be connected to the $C_8$ output of Group Carry Generation Block 133. As to the XNOR output for this stage, the input $P_7$ may be connected through a stack of two inverters (41 and 32) to one of the inputs of NAND gate 33, and the input $G_7$ may be connected through an inverter (31) to the other input of NAND gate 33. The output of NAND gate 33 may be connected through a stack of two inverters (34-35) to the output $A_7$ XNOR $B_7$ of Group 3 Carry Generate Block 133.

The fourth stage will now be discussed. The $P_8$ input may be connected through three inverters (63, 59, and 60) to an input of INVERT-AND gate 61 and an AND input of INVERT-AND-OR gate 56. The output from inverter 43 may be connected to other input to INVERT-AND gate 61. The output of INVERT-AND gate 61 may be connected through an inverter (62) to an AND input of INVERT-AND-OR gate 58. The input $C_{5b}$ may be connected to the other AND input of INVERT-AND-OR gate 58. The output of inverter 37 may be connected to the other AND input of INVERT-AND-OR gate 56. The $G_8$ input may be connected through a stack of three inverters (50, 51, and 55) to the OR input of INVERT-AND-OR gate 56. The output of INVERT-AND-OR gate 56 may be connected through an inverter (57) to the OR input of INVERT-AND-OR gate 58. The output of INVERT-AND-OR gate 58 may be connected to the $C_9$ output of Group 3 Carry Generate Block 133. As to the XNOR output for this stage, the $P_8$ input may be connected through a stack of two inverters (63 and 59) to an input of NAND gate 52. The $G_8$ input may be connected through an inverter (50) to the other input of NAND gate 52. The output of NAND gate 52 may be connected through a stack of two inverters (53-54) to the $A_8$ XNOR $B_8$ output of Group 3 Carry Generate Block 133.

The fifth stage for this group may be provided as follows. The $P_9$ input may be connected to one input of NAND gate 77, and the $P_8$ input may be connected to the other input of NAND gate 77. The output of NAND gate 77 may be connected through a stack of two inverters (78-79) to INVERT-AND gate 80 and to an AND input of INVERT-AND gate 74. The output of inverter 43 may be connected to the other input of INVERT-AND gate 80. The output of inverter 37 may be connected to the other AND input of INVERT-AND-OR gate 74. The output of INVERT-AND gate 80 may be connected through an inverter (81) to an AND input of INVERT-AND-OR gate 82. The input $C_{5b}$ may be connected to the other AND input of INVERT-AND-OR gate 82. The $P_9$ input may be connected to one of the AND inputs of AND-OR-INVERT gate 71, and the $G_8$ input may be connected to the other AND input of AND-OR-INVERT gate 71. The $G_9$ input may be connected to the OR input of AND-OR-INVERT gate 71. The output of AND-OR-INVERT gate 71 may be connected through a stack of two inverters (72-73) to the OR input of INVERT-AND-OR gate 74. The output of INVERT-AND-OR gate 74 may be connected through an inverter (75) to the OR input of INVERT-AND-OR gate 82. The output of INVERT-AND-OR gate 82 may be connected to the $C_{10}$ output of Group 3 Carry Generate Block 133. As to the XNOR output for this stage, the $P_9$ input may be connected through a stack of two inverters (69 and 70) to an input of NAND gate 66. The $G_9$ input may be connected through an inverter (65) to the other input of NAND gate 66. The output of NAND gate 66 may be connected through two inverters (67-68) to the $A_9$ XNOR $B_9$ output of Group 3 Carry Generate Block 133.

Finally, the sixth stage will be discussed. The $P_{10}$ input may be connected through an inverter (90) to an input of INVERT-AND gate 91 and to an AND input of PARTIAL-INVERT-AND-OR gate 92. The output from AND-OR-INVERT gate 71 may be connected to the other input of INVERT-AND gate 91. The output of INVERT-AND gate 91 may be connected to an input of NAND gate 95. The output of INVERT-AND gate 42 may be connected to the other input of NAND gate 95. The output of PARTIAL-INVERT-AND-OR gate 36 may be connected to an AND input of AND-OR-INVERT gate 93. The output of NAND gate 95 may be connected to an AND input of INVERT-AND-OR gate 94. The input $C_{5a}$ may be connected to the other AND input of INVERT-AND-OR gate 94. The output of NAND gate 77 may be connected to the other AND input of gate PARTIAL-INVERT-AND-OR 92. The input $G_{10}$ may be connected through an inverter (85) to the OR input of gate 92. Like gate 36 (discussed above), PARTIAL-INVERT-AND-OR gate 92 inverts the two AND inputs (but not the OR input) prior to performing and AND-OR function. The output of gate PARTIAL-INVERT-AND-OR 92 may be connected to the OR input of AND-OR-INVERT gate 93. The output of gate 36 may be connected to the other AND input of AND-OR-INVERT gate 93. The output of AND-OR-INVERT gate 93 may be connected to the OR input of INVERT-AND-OR gate 94. The output of INVERT-AND-OR gate 94 may be connected though a pair of inverters (96-97) to the $C_{11}$ output of Group 3 Carry Generation Block 133. In addition, INVERT-AND-OR gate 94 may be connected to output $C_{11a}$ and may be connected through an inverter (96) to output $C_{11b}$. As to the XNOR output for this stage, the $P_{10}$ input may be connected through a stack of two inverters (90 and 86) to an input of NAND gate 87. The $G_{10}$ input may be connected through an inverter (85) to the other input of NAND gate 87. The output of NAND gate 87 may be connected through two inverters (88-89) to the $A_{10}$ XNOR $B_{10}$ output of Group 3 Carry Generate Block 133.

An Example of the Improved Adder in Operation

Figure 6:
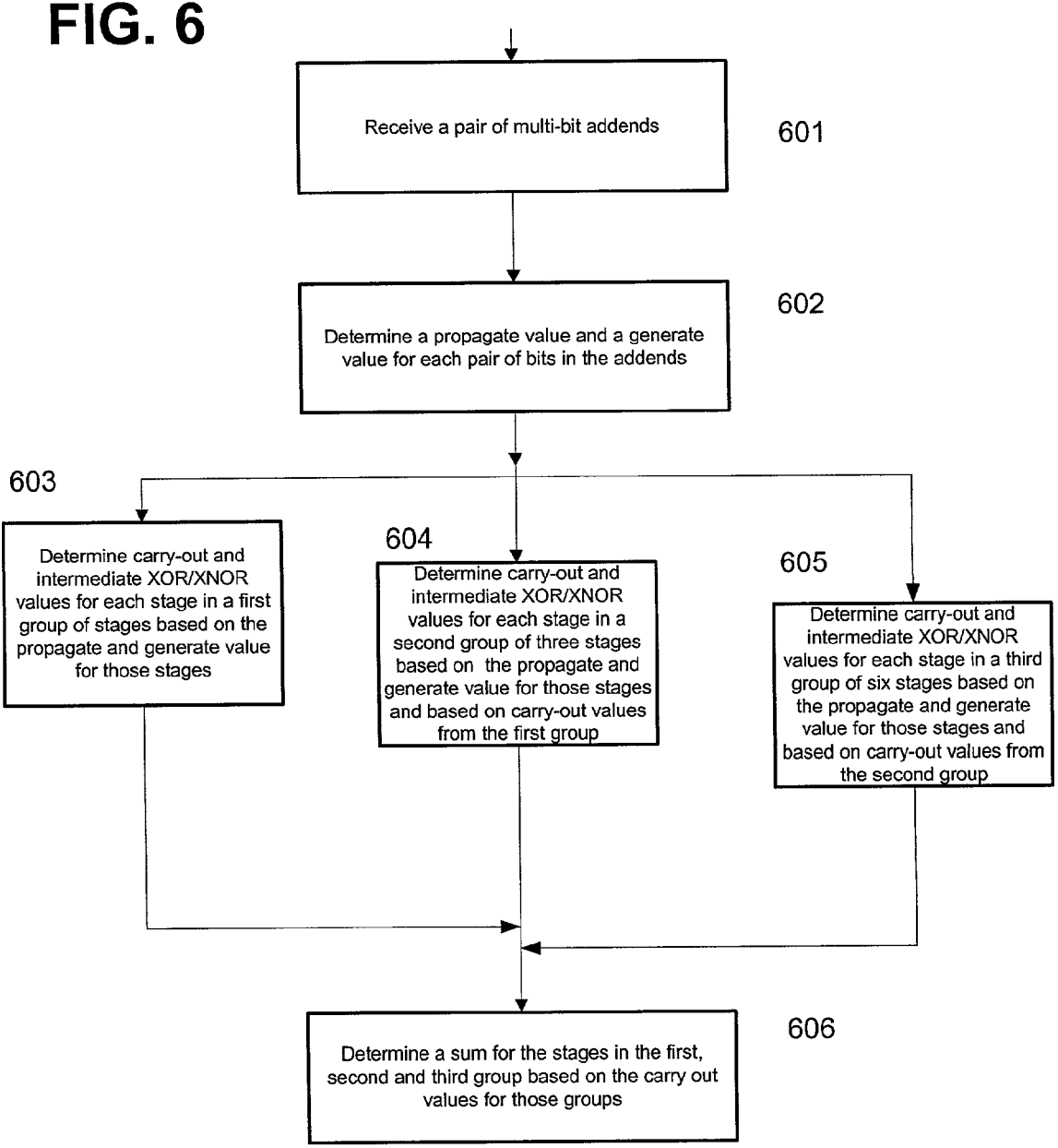
FIG. 6 is a flow diagram of a method of adding multi-bit numbers according to an embodiment of the present invention.

FIG. 6 is a flow diagram of a method of adding multi-bit numbers according to an embodiment of the present invention. This method is described with reference to the adder shown in FIGS. 1-4, but this method may also be practiced with other hardware implementations of this invention. The adder receives a pair of multi-bit addends (601) such as, for example, A and B in FIG. 1. As shown in this example, the bits $A_{0-10}$ and $B_{0-10}$ may be received at Propagate/Generate Blocks 110-120. A propagate and a corresponding generate value may then be determined for each pair of bits in the addends (602). With reference to the embodiment in FIG. 1, Propagate/Generate Block 110 determines a $P_0$ and $G_0$ value for the first stage ($A_0$ and $B_0$), Propagate/Generate Block 111 determines a $P_1$ and $G_1$ value for the second stage ($A_1$ and $B_1$), Propagate/Generate Block 112 determines a $P_2$ and $G_2$ value for the third stage ($A_2$ and $B_2$), etc. A carry-out value and intermediate XOR/XNOR value may then be determined for each stage in a first group of stages based on the propagate and generate values for those stages (603). Thus, Group 1 Carry Generation Block 131 determines inverted $C_{in}$, inverted $C_1$, inverted $C_2$, $C_{2a}$, and $C_{2b}$ and corresponding intermediate XOR values based on the values $P_1$, $G_1$, $P_2$, and $G_2$. A carry-out value and intermediate XNOR value may also be determined for each stage in a second group of three stages based on the propagate and generate values for those stages and based on the carry-out values from the first group (604). Similarly, a carry-out value and intermediate XNOR value may be determined for each stage in a third group of six stages based on the propagate and generate values for those stages and based on the carry-out values from the second group (605). Finally, a sum may be determined for the stages in the first, second, and third group based on the carry out and intermediate XNOR values for those groups (606). Thus, the only value that crosses a group boundary is a carry value. In the embodiment shown in FIG. 1, the values $Sum_{0-10}$ are determined by Final XNOR Blocks 160-170 for all eleven stages in groups 1-3. In this embodiment, $Sum_{0-10}$ are determined by performing an XOR function between either (1) the inverted carry-out values and the result of $A_i$ XOR $B_i$ or (2) the carry-out and the result of $A_i$ XOR $B_i$. In FIG. 1, blocks 160-170 may be referred to as the "final" XNOR because they perform the last XNOR that determines the Sum bits. In other embodiments, the adder may contain additional logic to perform pre-processing or post-processing, such as for example a series of 3-2 reducers and/or multiplexers on the front end.

As suggested by FIG. 6, the carry-out and intermediate XOR/XNOR values for the first, second, and third group may be calculated in parallel. In an embodiment, the outputs of each group carry generation block arrive at substantially the same time. The outputs of group 3 may be delayed slightly from the group 2 outputs, and the outputs of group 2 may be delayed slightly from the group 1 outputs. As discussed above, the output for group 2 depends upon the inputs $C_{2a}$ and $C_{2b}$ from group 1, and the outputs for group 3 depend upon the inputs $C_{5a}$ and $C_{5b}$ from group 2. Although a carry value for a particular stage is ultimately dependent upon the carry values for all previous stages, according to carry look-ahead principles the carry for a stage may be based on intermediate results for previous stages. For example, in generating the $C_4$ output, the fifth stage in the adder 452 may be determined without using the $C_3$ from the fourth stage 451. By contrast, in the embodiment shown the first three stages in the adder (351-353) receive as an input the carry value from the previous stages.

According to embodiments of the invention, the intermediate propagate and generate gates for at least some stages are arranged in clusters having a size that is a multiple of three. In the embodiment shown, INVERT-AND gate 435 and INVERT-AND gate 42 are 3-bit group generate gates, and INVERT-AND-OR gate 430 and PARTIAL-INVERT-AND-OR gate 36 are 3-bit group propagate gates. INVERT-AND gate 435 and INVERT-AND gate 42 aggregate 3 stages worth of generate bits into a value that may be combined with the output of the corresponding 3-bit group generate gates in an AND-OR-INVERT gate (425 and 40) to provide the carry-out values for that stage. Similarly, INVERT-AND gate 91 is a 6-bit group generate gate and AND-OR-INVERT gate 93 is a 6-bit group propagate gate. INVERT-AND gate 91 aggregates 6 stages worth of generate bits into a value that may be combined with the output of AND-OR-INVERT gate 93 in INVERT-AND-OR gate 94 to provide the carry-out values for the twelfth adder stage.

In the embodiments shown, the critical path starts at the $C_{in}$ input and traces through AND-OR-INVERT gate 309, INVERT-AND-GATE 317, and AND-OR-INVERT gate 431. In these embodiments, the elements on the critical path are buffered from the rest of the circuit to minimize the load on the critical path and therefore increase the speed of the critical path. For example, the carry outputs $C_{1-11}$ are buffered from the critical path by two or more buffers, thus isolating the critical path from the carry generates $C_{1-11}$. In particular, the output of AND-OR-INVERT gate 309 is routed through buffers 310 and 311 before it is provided to Final XNOR block 161. In addition, intermediate generate gates, intermediate propagate gates, and intermediate carrys are buffered from the critical path to minimize the load on the critical path. According to embodiments of the invention, a signal that is inverted by such a buffer may be reinverted by the gate that is receiving the signal. Thus, for example, the signal that is input to INVERT-AND-OR gate 317 is logically inverted prior to performing the AND-OR function. By contrast, the critical path proceeds from one complex gate to another without any buffers or other inversion. In an embodiment, most of the capacitance being driven by gate 317 is capacitance from gate 431 of FIG. 4.

In embodiments of the invention, structural similarities repeat every third stage in the adder. For example, in the embodiment disclosed in FIGS. 4-5, the logic to provide carry generation outputs $C_{6-8}$ is analogous to the logic discussed above with reference to carry generation outputs $C_{3-5}$. Thus, an AND-OR function is performed on the inputs $P_2$ and $G_2$ (after inversions and reinversions) and the carry-in $C_{2b}$ to obtain the carry-out inverted $C_3$. Similarly, an AND-OR function is performed on the inputs $P_5$ and $G_5$ (after inversions and reinversions) and the carry in $C_{5b}$ to obtain the carry-out $C_6$. In embodiments of the invention, one or more gates in the adder have transistor stacks that are tapered to increase the speed of the stack. An example of a transistor stack with tapered gates is discussed below with reference to embodiments of AND-OR-INVERT gates in adder 100.

Example Embodiments of AND-OR-INVERT Gates

Figure 7:
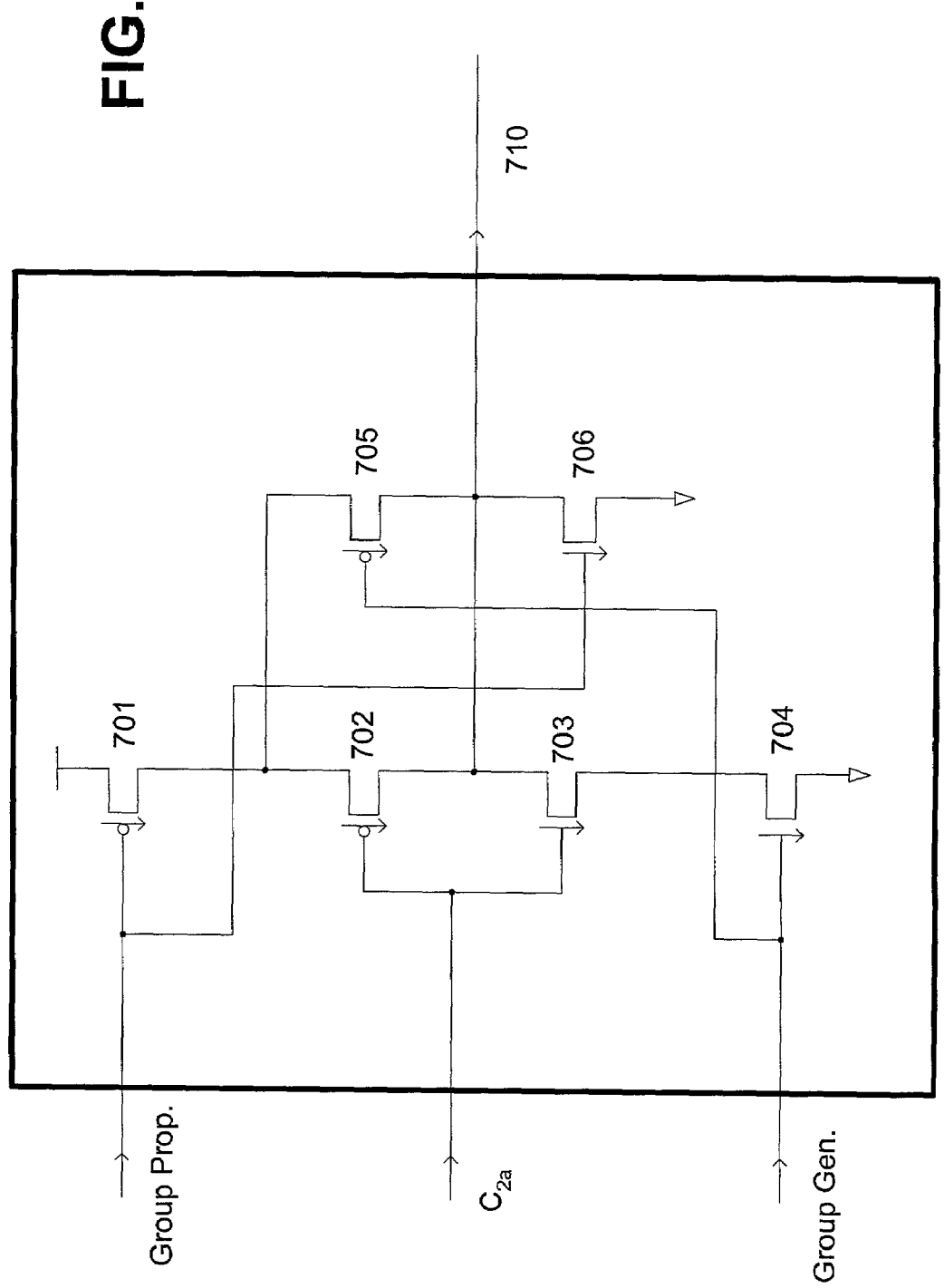
FIG. 7 is a block diagram of an AND-OR-INVERT gate with tapered stacks according to an embodiment of the present invention.

FIG. 7 is a block diagram of an AND-OR-INVERT gate 431 with tapered stacks according to an embodiment of the present invention. In an embodiment, other AND-OR-INVERT gates in adder 100 may also use this topology. FIG. 7 shows that inputs to AND-OR-INVERT gate 431 are group propagate (from gate 435), group generate (from gate 430) and $C_{2a}$. The output 710 of AND-OR-INVERT gate 431 may be used as $C_{5a}$ of FIG. 1. AND-OR-INVERT gate 431 includes three P-channel metal-oxide semiconductor (PMOS) transistors (701, 702, and 705) and three N-channel metal-oxide semiconductor (NMOS) transistors (703, 704, and 706). The source of transistor 701 may be connected to Vcc, and the drain of transistor 701 may be connected to the source of transistor 702. The drain of transistor 702 may be connected to the source of transistor 703, the drain of transistor 703 may be connected to the source of transistor 704, and the drain of transistor 704 may be connected to ground. The source of transistor 705 may be connected to the drain of transistor 701, the drain of transistor 705 may be connected to the source of transistor 706, and the drain of transistor 706 may be connected to ground.

In this embodiment, the group propagate input may be connected to the gate of transistor 701 and of transistor 706. The group generate input may be connected to the gate of transistor 704 and of transistor 705. The $C_{2a}$ input may be connected to the gates of transistor 702 and transistor 703. The output 710 may be connected both to a point between transistor 702 and transistor 703 and to a point between transistor 705 and transistor 706. According to this embodiment, and as would be appreciated by a person of ordinary skill in the art, the output 710 will be equal to inverted (group propagate AND $C_{2a}$) OR group generate).

This embodiment contains a number of transistor stacks which are connections from a voltage supply to an output. One stack in AND-OR-INVERT gate 431 is transistor 701 and transistor 702 (to output 710). Another is transistor 701 to 705, and another is transistor 704 to 703. In an embodiment, the stacks are tapped so that the transistor closer to the output is smaller. For example, transistor 701 may be 2.6 microns, transistor 702 may be 1.3 microns, and transistor 705 may be 1.3 microns. As another example, transistor 704 may be 2 microns and transistor 703 may be 1 micron. Transistor 706 may be 0.7 microns. In this example, the PMOS transistors may be sized larger than the NMOS because of tower mobility. As discussed above, the use of the tapered stack may allow for an increase in speed in the critical path, which includes transistors 702 and 703, in that the larger transistor has reduced resistance and thus a reduced delay. In this way, the load on the critical path may be reduced. In an embodiment, the delay of AND-OR-INVERT gate 431 may be reduced to about the delay of an inverter with a fanout of 2. The use of the tapered stack may provide for crisper edge rates on the output because of the increased speed, which may tend to create higher edge rates for succeeding stage. In an embodiment, every transistor stack in the critical path of adder 100 is tapered. In another embodiment, every transistor stack in adder 100 is tapered.

FIG. 8 is a block diagram of another AND-OR-INVERT gate 309 with tapered stacks and a reduced number of serial transistors according to an embodiment of the present invention. As shown in FIG. 3, inputs to AND-OR-INVERT gate 309 are $G_0$, $C_{in}$, and $P_0$ and the output to AND-OR-INVERT gate 309 is group generate 810. As also shown in FIG. 3, AND-OR-INVERT gate 309 performs the function (invert ($P_0$ AND $C_{in}$) OR $G_0$). AND-OR-INVERT gate 309 has PMOS transistors 801, 802 and 805 and NMOS transistors 803, 804 and 806 which are analogous to AND-OR-INVERT gate 431 of FIG. 7. In AND-OR-INVERT gate 309, the input $G_0$ is connected to the gate of transistors 801 and 806, the input $P_0$ is connected to the gate of transistors 804 and 805, and the input $C_{in}$ is connected to the gate of transistors 802 and 803. Thus, the arrangement of the inputs in AND-OR-INVERT gate 309 is analogous to the arrangement of the inputs in AND-OR-INVERT gate 431 of FIG. 7. The output 810 in AND-OR-INVERT gate 309 may be connected both to a point between transistors 805 and 806 and to a point between transistors 802 and 803.

Instead of the source of transistor 805 being connected to a point between transistors 802 and 803 (such as in AND-OR-INVERT gate 431), the source of transistor 805 may be connected to the voltage supply. In this way, the number transistor serial stacks is reduced. Thus, AND-OR-INVERT gate 309 has only two transistor stacks. One stacks is 801 and 802, and the other is transistors 804 and 803. This arrangement allows the speed of carry generate gate 309, and of the critical path, to be increased. Although a contention condition could occur for AND-OR-INVERT gate 309 arranged as shown in the case where $P_0=0$ and $G_0=1$, this case should not occur because of the logical dependency between $P_0$ and $G_0$. As discussed above, $P_0=A_0$ OR $B_0$, and $G_0=A_0$ AND $B_0$. In embodiments, this arrangement may be used for other AND-OR-INVERT gates for which the $P_i$ and $G_i$ are inputs, such as for example AND-OR-INVERT gate 417 of FIG. 4. As is also discussed above, the transistor stacks in AND-OR-INVERT gate 309 may be tapered so that the transistors at the bottom of the stacks (804 and 806) is larger than the transistors above (801-803 and 805).

The INVERT-AND-OR gates in adder 100 may use a conventional topology. In embodiments, the INVERT-AND-OR gates may be analogous to AND-OR-INVERT gates 309 and 431 with the PMOS and NMOS transistors switched. The NAND gates and INVERT-AND gates may also use conventional topologies. In addition, as discussed above, some or all of the transistor stacks in adder 100 may be tapered.

Adder circuits using the topologies disclosed herein may be faster and have fewer wires than in known carry generate adder circuits. Because fewer wires are used, the circuit may not switch as much capacitance. In an embodiment, the long wires in the critical path may dominate the loading. In an embodiment, the present invention reduces the number of wires without adding additional stages to the circuit, thus resulting in lower power usage and allowing for the optimization of the critical path. Several embodiments of the present invention are specifically illustrated and/or described herein. However, it will be appreciated that modifications and variations of the present invention are covered by the above teachings and within the purview of the appended claims without departing from the spirit and intended scope of the invention. For example, the embodiments above are static implementations of invention. Other implementations may also be employed, such as for example a cascaded domino, zipper domino, D1 domino, or other form of logic. In addition, other embodiments may employ latches and clocks signals in order to sequence the logic into pipe stages (for purposes of simplification, such latches and clock signals are not shown in the above embodiments). In such embodiments, the laches may be located at different places in the circuit based on the amount of logic that would be desired for a clock cycle, which in turn may depend upon the frequency of the clock. Additional latches may be used as the frequency of the clock is increased.

What is claimed is:

1. A method of adding two multi-bit addends, the method comprising:
    receiving two multi-bit addends;
    determining a propagate value and a corresponding generate value for each bit of the addends;
    determining a carry-out value for each propagate value based at least in part on the propagate value and corresponding generate value, wherein the carry-out values are determined by a plurality of carry generation blocks, and wherein one of the carry generation blocks determines exactly three of the carry-out values, wherein determining every third carry-out value in said one of the carry generation blocks includes determining a group propagate value and a group generate value; and
    determining a sum value for each carry-out value based at least in part on the carry-out value.

2. The method of claim 1, wherein another of the carry generation blocks determines exactly six of the carry-out values.

3. The method of claim 1, wherein the method further comprises determining an intermediate XOR value for each of said propagate values based on the propagate value and corresponding generate value, wherein sum values are based at least in part on the intermediate XOR values, and wherein intermediate XOR values are determined without using an XOR gate.

4. The method of claim 1, wherein there is a single critical path through the plurality of carry generation blocks.

5. The method of claim 4, wherein gates in the critical path have tapered transistor stacks.

6. The method of claim 1, wherein determining one or more of the carry-out values includes combining a propagate value, a generate value, and a carry-in value in a gate that has only two transistor stacks.

7. A look-ahead carry adder circuit, comprising:
    inputs to receive two multi-bit addends;
    a plurality of blocks each of which is connected to one input bit of both of the multi-bit addends, wherein each block has a propagate output and a corresponding generate output;
    a plurality of carry generation blocks each having inputs connected to two or more of said propagate outputs and two or more of said corresponding generate outputs, wherein one of the carry generation blocks is connected to exactly three of the propagate outputs and three of the corresponding generate outputs, and wherein each of the carry generation blocks has a plurality of carry outputs, each of said carry outputs to be determined based at least in part on one of the propagate values and one of the corresponding generate values, wherein in said one of the carry generation blocks, every third carry-out value is to be determined from a group propagate value and a group generate value; and
    a plurality of final blocks each of which is connected to one of said carry outputs and each having a sum output.

8. The look-ahead carry adder circuit of claim 7, wherein another of the carry generation blocks is connected to exactly six of the propagate outputs and six of the generate outputs.

9. The look-ahead carry adder circuit of claim 7, wherein there is one critical path through the look-ahead carry adder circuit.

10. The look-ahead carry adder circuit of claim 9, wherein the critical path includes an AND-OR-INVERT gate having an output connected to an input of an INVERT-AND-OR gate.

11. The look-ahead carry adder circuit of claim 10, wherein the AND-OR-INVERT gate has only two transistor stacks.

12. The look-ahead carry adder circuit of claim 9, wherein inputs and outputs of gates on the critical path are buffered to reduce the load on the critical path.

13. The look-ahead carry adder circuit of claim 7, wherein the circuit contains a plurality of tapered transistor stacks.

14. The look-ahead carry adder circuit of claim 7, wherein some of the carry generation blocks have a plurality of NAND gates that have a pair of inputs that are connected to one of the propagate outputs and one of the generate outputs through one or more buffers, and wherein each of the NAND gates is connected to an XOR output of a carry generation block through a buffer.

15. The look-ahead carry adder circuit of claim 7, wherein the circuit has a plurality of gates to provide a group generate value and a plurality of gates to provide a group propagate value, and wherein group generate gates are arranged in clusters having a size that is a multiple of three.

16. A method of adding two multi-bit addends, the method comprising:
receiving two multi-bit addends;
determining a propagate value and a corresponding generate value for each bit of the addends;
determining a carry-out value for each propagate value based at least in part on the propagate value and corresponding generate value, wherein the carry-out values are determined by a plurality of carry generation blocks that include a plurality of tapered transistor stacks wherein in each stack, a transistor at a bottom of each stack is larger than a transistor at a top of each stack; and
determining a sum value for each carry-out value based at least on part of the carry-out value.

17. The method of claim 16, wherein the method further comprises determining an intermediate XOR value for each of said propagate values based on the propagate value and corresponding generate value, wherein sum values are based at least in part on the intermediate XOR values, and wherein intermediate XOR values are determined without using an XOR gate.

18. The method of claim 16, wherein there is a single critical path through the plurality of carry generation blocks.

19. The method of claim 18, wherein gates in the critical path have tapered transistor stacks.

20. The method of claim 16, wherein determining one or more of the carry-out values includes combining a propagate value, a generate value, and a carry-in value in a gate that has only two transistor stacks.

21. A look-ahead carry adder circuit, comprising:
inputs to receive two multi-bit addends;
a plurality of blocks each of which is connected to one input bit of both of the multi-bit addends, wherein each block has a propagate output and a generate output;
a plurality of carry generation blocks each having inputs connected to two or more of said propagate outputs and two or more of said generate outputs, wherein each of the carry generation blocks has a plurality of carry outputs, and wherein there is one critical path through the plurality of carry generation blocks wherein inputs and outputs of gates on the critical path are buffered to reduce the load on the critical path; and
a plurality of final blocks each of which is connected to one of said carry outputs and each having a sum output.

22. The look-ahead carry adder circuit of claim 21, wherein the critical path includes an AND-OR-INVERT gate having an output connected to an input of an INVERT-AND-OR gate.

23. The look-ahead carry adder circuit of claim 22, wherein the AND-OR-INVERT gate has only two transistor stacks.

24. The look-ahead carry adder circuit of claim 21, wherein the circuit contains a plurality of tapered transistor stacks.

25. The look-ahead carry adder circuit of claim 21, wherein some of the carry generation blocks have a plurality of NAND gates that have a pair of inputs that are connected to one of the propagate outputs and one of the generate outputs through one or more buffers, and wherein each of the NAND gates is connected to an XOR output of a carry generation block through a buffer.

* * * * *